(12) United States Patent
Daou et al.

(10) Patent No.: US 7,538,519 B2
(45) Date of Patent: May 26, 2009

(54) INFORMATION HANDLING SYSTEM WITH BATTERY PROTECTED FROM NON-PERMANENT FAILURES

(75) Inventors: Youssef Daou, Austin, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 10/998,067

(22) Filed: Nov. 24, 2004

(65) Prior Publication Data

US 2006/0108982 A1    May 25, 2006

(51) Int. Cl.
- H02J 7/00 (2006.01)
- H02J 7/04 (2006.01)
- H02J 7/06 (2006.01)
- H02H 9/00 (2006.01)
- H02H 3/00 (2006.01)
- H02H 3/08 (2006.01)
- H02H 9/08 (2006.01)
- H02H 3/22 (2006.01)

(52) U.S. Cl. ............... 320/134; 320/116; 320/118; 320/128; 320/132; 320/136; 320/155; 320/157; 320/158; 320/159; 320/162; 320/163; 320/164; 361/57; 361/60; 361/78; 361/79; 361/87; 361/93.1; 361/93.5; 361/93.7; 361/93.9; 361/96; 361/97; 361/101; 361/111

(58) Field of Classification Search ................ 320/116, 320/118, 128, 132, 134, 136, 155, 157–159, 320/162–164; 361/57, 60, 78, 79, 87, 93.1, 361/93.5, 93.7, 93.9, 96, 97, 101, 111
See application file for complete search history.

(56) References Cited

U.S. PATENT DOCUMENTS

| | | | |
|---|---|---|---|
| 4,839,770 A * | 6/1989 | Ruta | ........................... 361/94 |
| 5,568,039 A | 10/1996 | Fernandez | |
| 5,804,944 A * | 9/1998 | Alberkrack et al. | ......... 320/163 |
| 5,818,200 A | 10/1998 | Cummings et al. | |
| 6,057,728 A * | 5/2000 | Igarashi | ...................... 327/546 |
| 6,262,562 B1 | 7/2001 | Cummings et al. | |
| 6,268,713 B1 * | 7/2001 | Thandiwe | ................... 320/134 |
| 6,307,349 B1 * | 10/2001 | Koenck et al. | ............... 320/112 |
| 6,340,889 B1 * | 1/2002 | Sakurai | ...................... 324/433 |
| 2002/0167294 A1 | 11/2002 | Odaohhara | |

* cited by examiner

Primary Examiner—Akm E Ullah
Assistant Examiner—Jue Zhang
(74) Attorney, Agent, or Firm—Haynes and Boone, LLP

(57) ABSTRACT

In a method and system for protecting a battery being charged by an electrical device, a current flowing through a cell stack of the battery is measured. If the measured current is greater than a predefined value the battery is isolated from the device. If subsequent current measurements made within a predefined time interval indicate that the measured current is less than or equal to the predefined value then the battery is recoupled to the device. If the measured current remains greater than the predefined value during the predefined time interval then a fuse is blown and the battery is disabled.

19 Claims, 6 Drawing Sheets

INFORMATION HANDLING SYSTEM WITH BATTERY PROTECTED FROM NON-PERMANENT FAILURES

BACKGROUND

The present disclosure relates generally to information handling systems, and more particularly to battery packs commonly used to provide power to portable information handling system components such as notebook computers, personal digital assistants (PDA's), cellular phones and gaming/entertainment devices.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by a charger circuit, which passes an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, since typically, a user of the device powered by the battery had no reliable advance warning that the energy supplied by the rechargeable battery was about to run out.

Today, through the development of "smart" or "intelligent" battery packs, batteries have become a more reliable source of power by providing information to the IHS and eventually to a user as to the relative state of charge (RSOC), as well as a wealth of other information. Such a battery is typically equipped with electronic circuitry to monitor and control its operation. The electronic circuitry may include semiconductor chips such as microprocessors, application specific integrated circuits (ASIC's), programmable devices, and/or component based circuits.

The information is typically communicated to the IHS using a communications bus. Examples of busses may include the well-known System Management Bus (SMBus), I2C bus, parallel bus, serial peripheral interface bus, universal serial bus and the like. Information pertaining to the battery being communicated via the communications bus connection may include data elements such as battery status, manufacturer name, serial and model number, voltage, current, temperature and charge status.

In contemporary portable IHS's it is common for the IHS to be supplied DC power by a battery pack. A battery pack 100, such as shown in FIG. 1, is connected to a battery charger/battery discharge circuit 110 of an IHS (not shown), which fulfills the dual functions of supplying DC power to the IHS and charging the battery's cell stack. Battery packs typically include a controller 120 that monitors for fault conditions. The controller 120 may also be referred to as a battery management unit (BMU). When the controller 120 detects an existence of a fault condition, a fuse 180 in the battery pack 100 is blown to prevent additional damage to the IHS.

In the conventional battery pack 100 shown in FIG. 1, the controller 120 controls a charging field effect transistor, C FET 140, and a discharge field effect transistor, D FET 150, both of which are situated in series in the positive line 155 of the battery pack 100. The C FET 140 and D FET 150 control the charging and discharging of a cell stack 105 included in the battery pack 100. A sense resistor 160 is situated in the negative line 170 of the battery pack 100. A protective fuse 180, which is typically controlled by the controller 120, is included to protect the portable IHS and the battery pack 100 from damage due to excessive current. If the controller 120 detects abnormally high current across the sense resistor 160, then the controller 120 opens the C FET 140 and the D FET 150. If the controller 120 continues to sense an abnormally high current through the sense resistor 160, then the controller 120 blows the fuse 180. The battery pack 100 is disabled and may not be revived.

While the approach described above does protect the IHS, it has been found that undesired noise, such as electromagnetic interference (EMI) and/or radio frequency interference (RFI) sources and/or other nearby noise generating sources, can prematurely cause the controller 120 to blow the fuse 180. This can occur by such noise entering the battery pack 100 on the negative line 170. For example, if the controller 120 detects an abnormally high current in the sense resistor 160, the controller 120 opens the C FET 140 and D FET 150. If noise enters the negative line 170 of the battery pack 100, the controller 120 may continue to see an abnormally high sense current, and in response, the controller 120 blows the fuse 180. In this scenario, the cell stack 105 is operational, and yet due to noise being interpreted as abnormally high sense current, the battery pack 100 is permanently disabled. The customer may be inconvenienced by having to return the battery pack 100, with a fully operational cell stack 105, to the manufacturer for a replacement. Obviously, processing returns for battery packs having an operational cell stack 105 increases costs to manufacturers and decreases customer satisfaction.

Therefore, a need exists to provide a method and system for recovering from transient (or non-permanent) abnormal operating conditions in a battery pack. Additionally, a need exists to isolate the battery pack from the IHS while determining the cause of the abnormal operating conditions. Accordingly, it would be desirable to provide a method for recovery from transient (or non-permanent) abnormal operating conditions in a battery pack included in an information handling system absent the disadvantages found in the prior methods discussed above.

SUMMARY

The foregoing need is addressed by the teachings of the present disclosure, which relates to a system and method for protecting a battery receiving a charge from an electrical device. According to one embodiment, in a method and system for protecting a battery being charged by an electrical device, a current flowing through a cell stack of the battery is measured. If the measured current is greater than a predefined value the battery is isolated from the device. If subsequent current measurements made within a predefined time interval indicate that the measured current is less than or equal to the predefined value then the battery is recoupled to the device. If the measured current remains greater than the predefined value during the predefined time interval then a fuse is blown and the battery is disabled.

Several advantages are achieved by the method and system according to the illustrative embodiments presented herein.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Many devices may require a software program called a device driver program that acts as a translator between an application program and the device, or between a user and the device. Examples of devices include AC/DC adapters, chargers, controllers, disk drives, scanners, printers, card readers, keyboards, and communication interfaces.

An increase in current due to failure causing transient events such as EMI/RFI noise is often prematurely identified as a failure of the battery and the battery is permanently disabled. The disabled battery is typically returned to the manufacturer for replacement. Tests conducted on the returned battery generally conclude that the cell stack of the battery is working properly. Thus, faulty premature disabling of the battery increases costs to manufacturers and decreases customer satisfaction. There is a need for a cost effective mechanism to protect batteries, especially from failure causing transient events.

According to one embodiment, in a method and system for protecting a battery being charged by an electrical device, a current flowing through a cell stack of the battery is measured. If the measured current is greater than a predefined value the battery is isolated from the device. If subsequent current measurements made within a predefined time interval indicate that the measured current is less than or equal to the predefined value then the battery is recoupled to the device. If the measured current remains greater than the predefined value during the predefined time interval then a fuse is blown and the battery is disabled.

Figure 2:
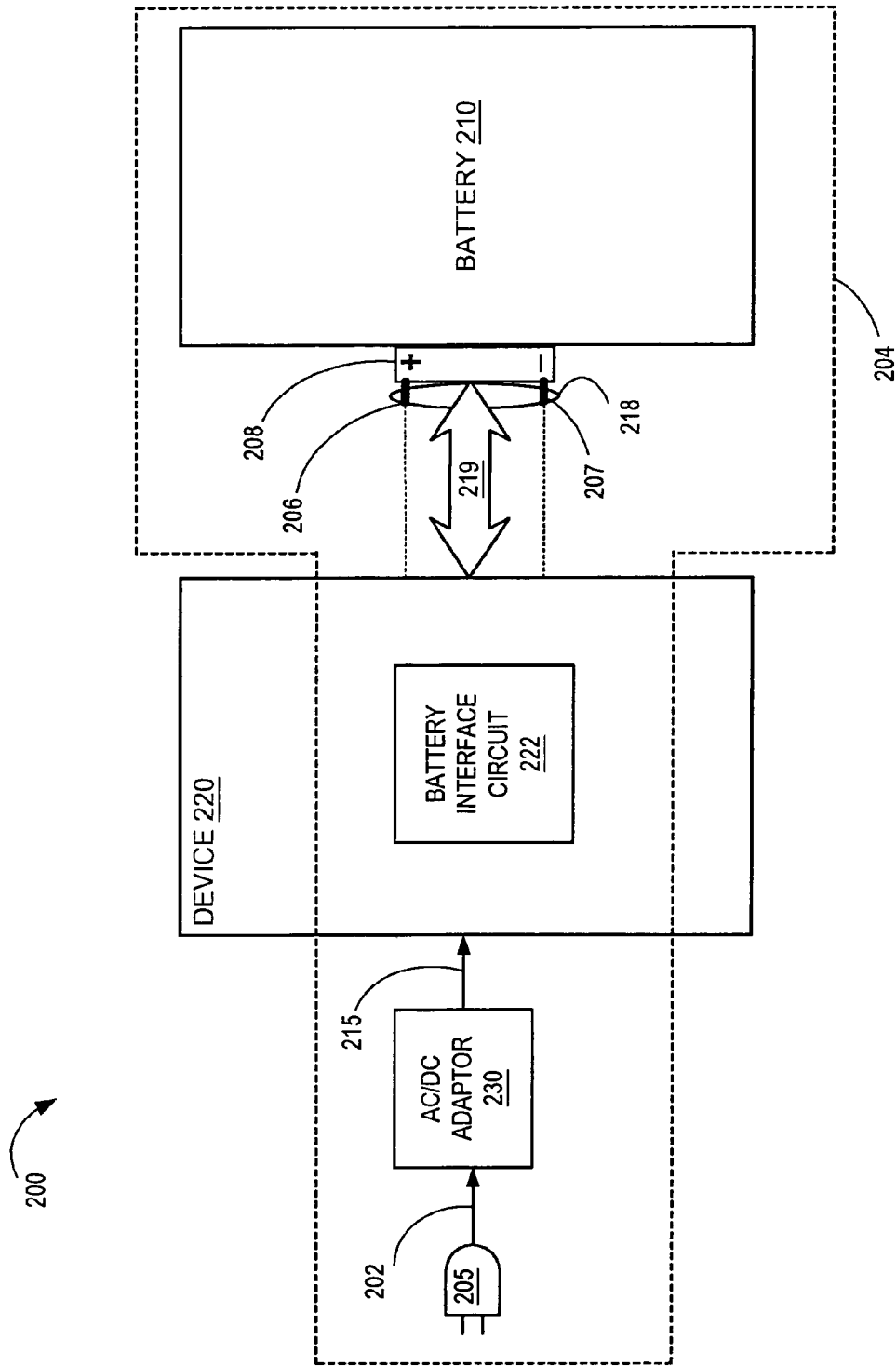
FIG. 2 illustrates a block diagram of a system for protecting an improved battery coupled to an electrical device, according to an embodiment.

FIG. 2 illustrates a block diagram of a system 200 for protecting an improved battery 210 coupled to an electrical device 220, according to an embodiment. In one embodiment, the system 200 is a portable IHS. In one embodiment, the device 220 includes a battery charger/battery discharge circuit or a battery interface circuit 222, which fulfills the dual functions of supplying DC power to various components of the IHS and providing a charge to the battery 210.

The battery handling circuit 222 is a part of a power supply system 204, which receives and converts an alternating current (AC) power input 202 to a direct current power (DC) output to power a load such as the portable IHS device or components thereof. The AC power input 202 is generally received from a 120 V, 60 Hertz or 220 V, 50 Hertz signal source from a wall outlet 205.

An AC-DC adaptor 230 converts the AC voltage input 202 to a DC voltage output 215 to provide DC power to the battery interface circuit 222 and other components. The DC voltage output 215 is nominally set to approximately 19.6 V, which is sufficiently high to charge the battery 210, included in the power supply system 204, to a fully charged state. The DC voltage output 215 for IHS devices such as PDA's and cellular phones may be lower.

The battery 210 is electrically coupled to the device 220 by battery charge and control lines 218. In one embodiment, the battery 210 includes a connector 208 for communicating signals on the battery charge and control lines 218. For example, the battery charge and control lines 218 may include a communications bus 219 such as the Systems Monitor Bus (SM Bus), which is widely used in the industry for communications between the battery 210 and a controller (not shown) of the system 200. The controller of the system 200 may also be referred to as a keyboard controller, an embedded controller or a serial I/O (SIO) controller. The battery charge and control lines 218 may also include a positive battery terminal 206 and negative battery terminal 207 for receiving and/or sending the charge. In one embodiment, the negative battery terminal 207 may be grounded (not shown) within the device 220. Additional details of the battery 210 are described in FIGS. 3A, 3B, and 3C.

Figure 1:
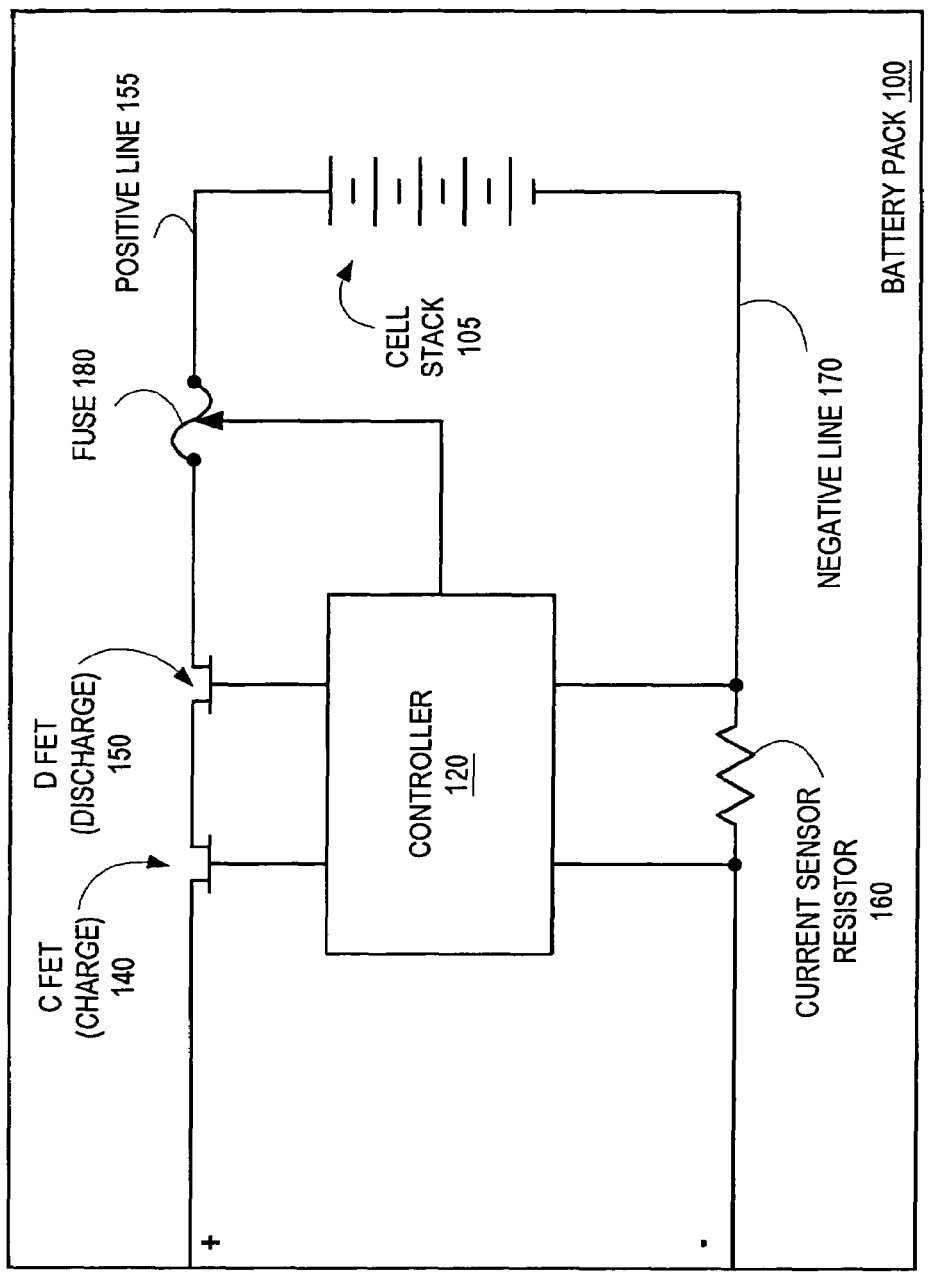
FIG. 1 illustrates a block diagram of a battery pack, described herein above, according to prior art.
Figure 1:
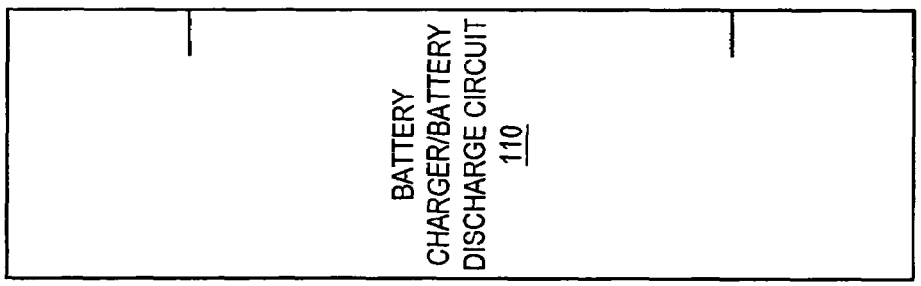
Figure 3A:
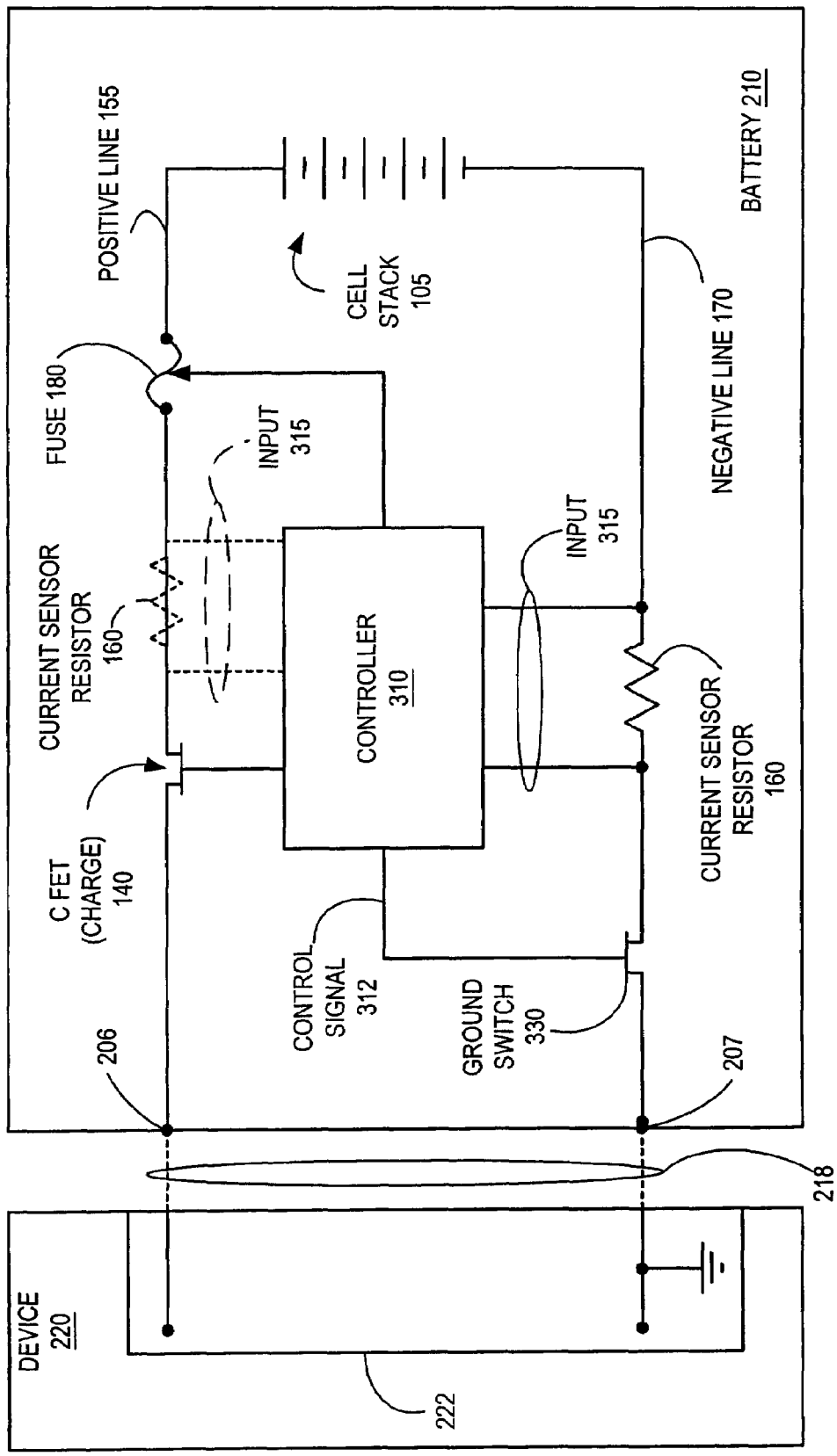
FIG. 3A illustrates additional details of the battery of FIG. 2, according to an embodiment.

FIG. 3A is a block diagram illustrating additional detail of the battery 210 of FIG. 2, according to an embodiment. In the depicted embodiment, the battery 210 includes: a) a controller 310, b) the cell stack 105, c) the fuse 180, d) the charging field effect transistor C FET 140, e) the current sense resistor 160, and f) a ground switch 330. The positive battery terminal 206, the C FET 140 and the fuse 180 are coupled in series in the positive line 155 of the cell stack 105 and the sense resistor 160, the ground switch 330 and the negative battery terminal 207 are coupled in series in the negative line 170 of the cell stack 105. In the depicted embodiment, the ground switch 330 also performs the functions of the D FET 150 of FIG. 1.

The controller 310 controls the operating condition of the battery 210, in co-ordination with the controller of the system 200 (not shown). More specifically, the controller 310 monitors battery related parameters such as the energy or charge level, voltage level and the current flowing through the rechargeable cell stack 105. In one embodiment, the battery 210 has a stack voltage of approximately (12V-16.8V) and (9V-12.6V) depending on the type of battery. The trend is towards the development of newer batteries having a lower stack voltage such as approximately (6-9V).

When requested, the controller 310 is operable to provide energy stored in the rechargeable cell stack 105 to the battery interface circuit 222 during a discharge operating condition. The ground switch 330 is enabled (turned on) and C FET 140 is disabled (turned off) in the discharge mode. The controller 310 notifies the battery interface circuit 222 when the energy level falls below a predefined threshold level. During a charge operating condition, the controller 310 is operable to receive a charge from the battery interface circuit 222 and transfer the charge to the rechargeable cell stack 105 when required. The ground switch 330 is enabled and C FET 140 is enabled in the charge mode. The controller 310 enables or disables the ground switch 330 by a control signal 312.

In one embodiment, the ground switch 330 and other switches such as C FET 140 are implemented using a MOSFET body diode. The MOSFET body diode is advantageously used to minimize the impact of an accidental reverse connection of the battery 210 and/or other over-current causing conditions.

In one embodiment, the controller 310 receives an input 315 from the current sense resistor 160 indicative of the current flowing through the cell stack 105. The controller 310 compares a value of the current measurement with a predefined value. In one embodiment, the input 315 may be a voltage measurement. In this embodiment, the controller 310 may compare a value of the voltage measurement with a predefined value. The specific value selected for the predefined value is dependent on application. In one embodiment, the predefined value may be set at 10 amperes. For portable IHS devices such as PDA's and cellular phones the predefined value may be lower. If the current exceeds the predefined value then, as an initial protective action, the controller 310 isolates the battery 210 from the device 220 (referred to as an isolated mode of operation). It does so by disabling the C FET 140 switch and disabling the ground switch 330. In addition, the battery charge and control lines 218 are also isolated by the controller 310. In one embodiment, the isolation may be performed by using one or more Q-switches (not shown) operable to open each of the individual bit lines that may be included in the battery charge and control lines 218. Thus, no current flows between the battery 210 and the device 220.

In one embodiment, at the time of isolating the battery 210 from the device 220, the controller 310 starts a timer for a predefined time interval. The predefined time interval is selectable based on application. In one embodiment, the predefined time interval is less than a synchronous time interval frame defined for communication on the communications bus (not shown).

The controller 310 continues to receive input 315 during the predefined time interval. The sampling frequency for measuring the current may vary from approximately 1 millisecond to 10 seconds depending on application. If a failure, e.g., the high current condition, is caused due to a transient event such as an occurrence of electrical noise, then current will continue to flow through the cell stack 105 even though the C FET 140 and the ground switch 330 have been disabled. The occurrence of noise, which may be generated due to EMI/RFI sources such as wireless radio devices, may be referred to as a transient failure event. The presence of EMI/RFI causes induced voltages/currents within the negative line 170 of the battery 210.

The magnitude of the current flowing through the cell stack 105 may remain above the predefined value as long as the source of the failure is present. In one embodiment, the predefined time interval is selected to allow sufficient time for the noise source causing the failure condition to clear. Upon removal of the source, e.g., the transient event causing the high current, the controller 310 determines during the predefined time interval that the current flowing through the cell stack 105 is less than or equal to the predefined value. That is, the transient failure event causes the current to be greater than the predefined value during a portion of the predefined time interval and a removal of the transient failure event within the predefined time interval causes the current not to be greater than the predefined value during another portion of the predefined time interval. In response to a determination that the current flowing through the cell stack 105 is less than or equal to the predefined value, the controller 310 enables the C FET 140 and the ground switch 330, thereby recoupling the battery 210 and the device 220.

If the source of the failure causing event does not clear and/or if the source is non-transient (or permanent) during the predefined time period then the current flowing through the cell stack 105 remains greater than the predefined value. In this situation, the controller 310 determines that the continued presence of a high current condition is a fatal, unrecoverable error and blows the fuse 180, thereby disabling the battery 210. The non-transient error may be caused due to various reasons including failure of the C FET 140 and/or the cell stack 105.

Figure 3B:
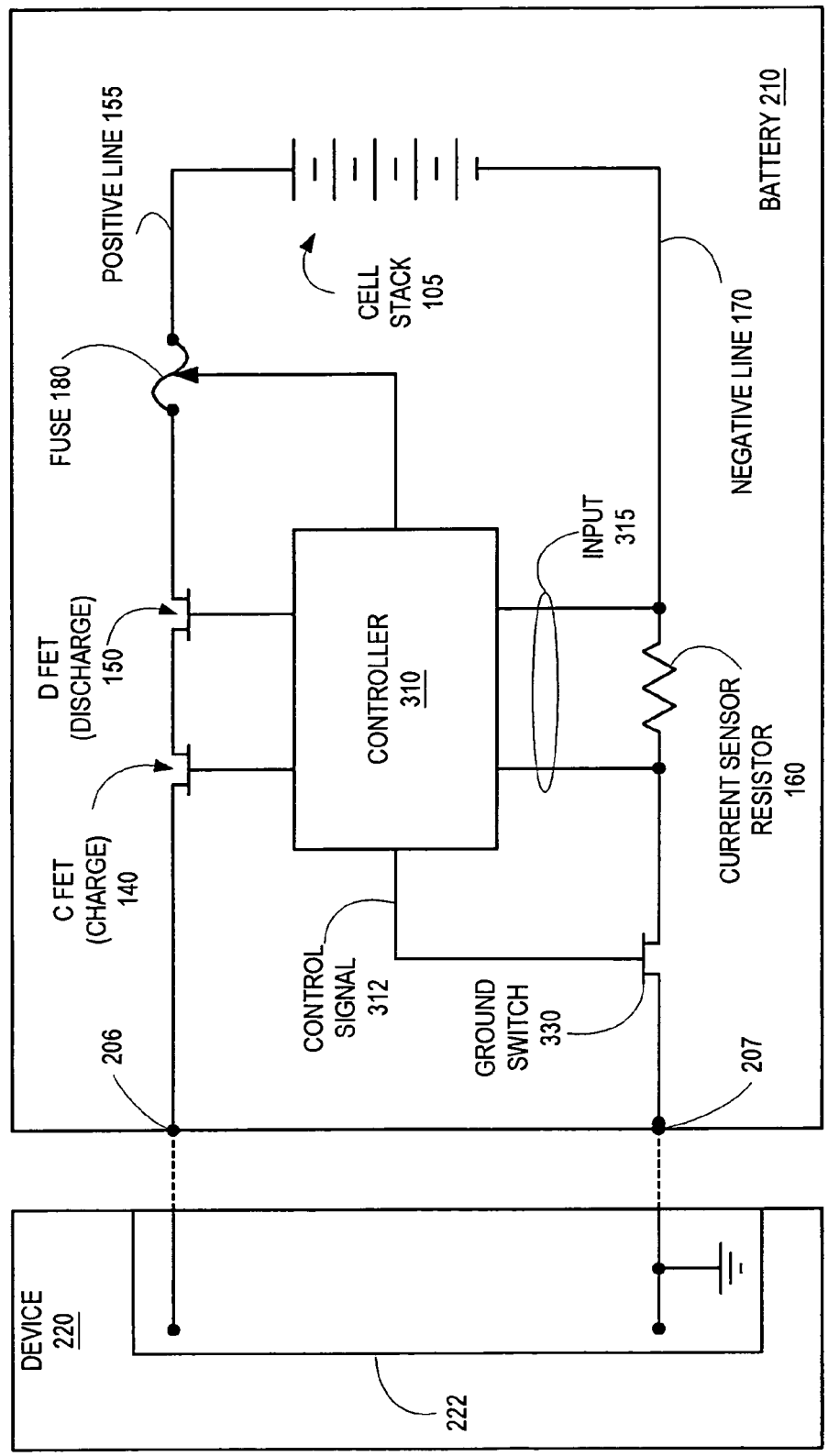
FIG. 3B illustrates additional details of the battery of FIG. 2, according to an embodiment.

FIG. 3B is a block diagram illustrating additional detail of the battery 210 of FIG. 2, according to an embodiment. In the depicted embodiment, the battery 210 is shown to be substantially similar in structure and operation to the battery of FIG. 3A except for an additional dedicated D FET 150. In the depicted embodiment, the D FET 150 is operable to control the current during a discharge mode of the cell stack 105.

In the depicted embodiment, the battery 210 includes: a) the controller 310, b) the cell stack 105, c) the fuse 180, d) the charging field effect transistor C FET 140, e) the discharge field effect transistor D FET 150, f) the current sense resistor 160, and g) the ground switch 330. The positive battery terminal 206, C FET 140, D FET 150 and the fuse 180 are coupled in series in the positive line 155 of the cell stack 105 and the sense resistor 160, the ground switch 330 and the negative battery terminal 207 are coupled in series in the negative line 170 of the cell stack 105.

The controller 310 controls the operating condition of the battery 210. The D FET 150 is enabled (turned on) and C FET 140 is disabled (turned off) in the discharge mode. During a charge operating condition, the controller 310 is operable to receive a charge from the battery interface circuit 222 and transfer the charge to the rechargeable cell stack 105 when required. The D FET 150 is enabled and C FET 140 is enabled in the charge mode.

With further reference to the above, FIG. 3A illustrates an alternative placement of the current sense resistor 160. In the depicted embodiment, the current sense resistor 160 may be located in the positive line 155 of the battery 210, between the C FET 140 and the fuse 180 rather than as previously described adjacent the ground switch 330.

In the depicted embodiment, the battery 210 includes: a) a controller 310, b) the cell stack 105, c) the fuse 180, d) the charging field effect transistor C FET 140, e) the current sense resistor 160, and f) a ground switch 330. The positive battery terminal 206, the C FET 140, the current sense resistor 160 and the fuse 180 are coupled in series in the positive line 155 of the cell stack 105 and the ground switch 330 and the negative battery terminal 207 are coupled in series in the negative line 170 of the cell stack 105. In the depicted embodiment, the ground switch 330 also performs the functions of the D FET 150 of FIG. 1. In one embodiment, the input 315 may be a voltage measurement. In this embodiment, the controller 310 may compare a value of the voltage measurement with a predefined value.

Figure 4:
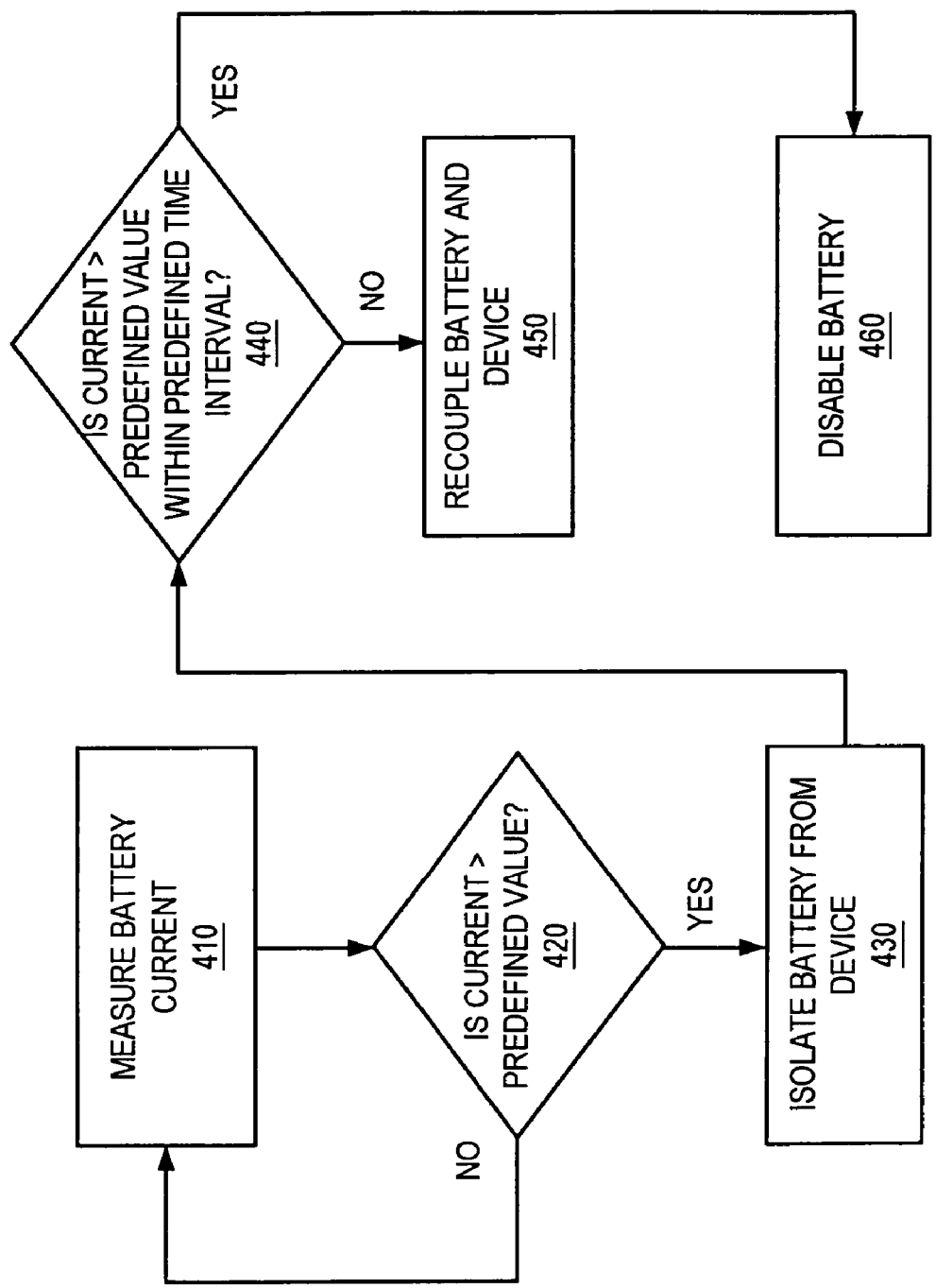
FIG. 4 is a flow chart illustrating a method for protecting the battery of FIG. 2, according to an embodiment.

FIG. 4 is a flow chart illustrating a method for protecting the battery 210 being charged by the electrical device 220 of FIG. 2, according to an embodiment. In step 410, a current flowing through the battery 210 is measured by receiving the input 315 from the current sense resistor 160. In step 420, a determination is made whether the current is above a predefined value. In step 430, if the current is determined to be above the predefined value then battery 210 is electrically isolated from the device 220, thereby interrupting the flow of current between the battery 210 and the device 220. In step 440, another determination is made during a predefined time interval following the isolation whether the current remains above the predefined value. In step 450, if the current is determined not to be above the predefined value during the predefined time interval then the battery 210 and the device 220 are recoupled, thereby re-enabling the flow of current between the battery 210 and the device 220. In step 460, if the current is determined to be above the predefined value during the predefined time interval then the battery 210 is identified to have a fatal error. The battery 210 is disabled when the controller 310 blows the fuse 180 in response to the current remaining above the predefined value during the predefined time interval. Various steps described above may be added, omitted, combined, altered, or performed in different orders. For example step 460 may be performed before step 450 or steps 450 and 460 may be performed in parallel.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 5:
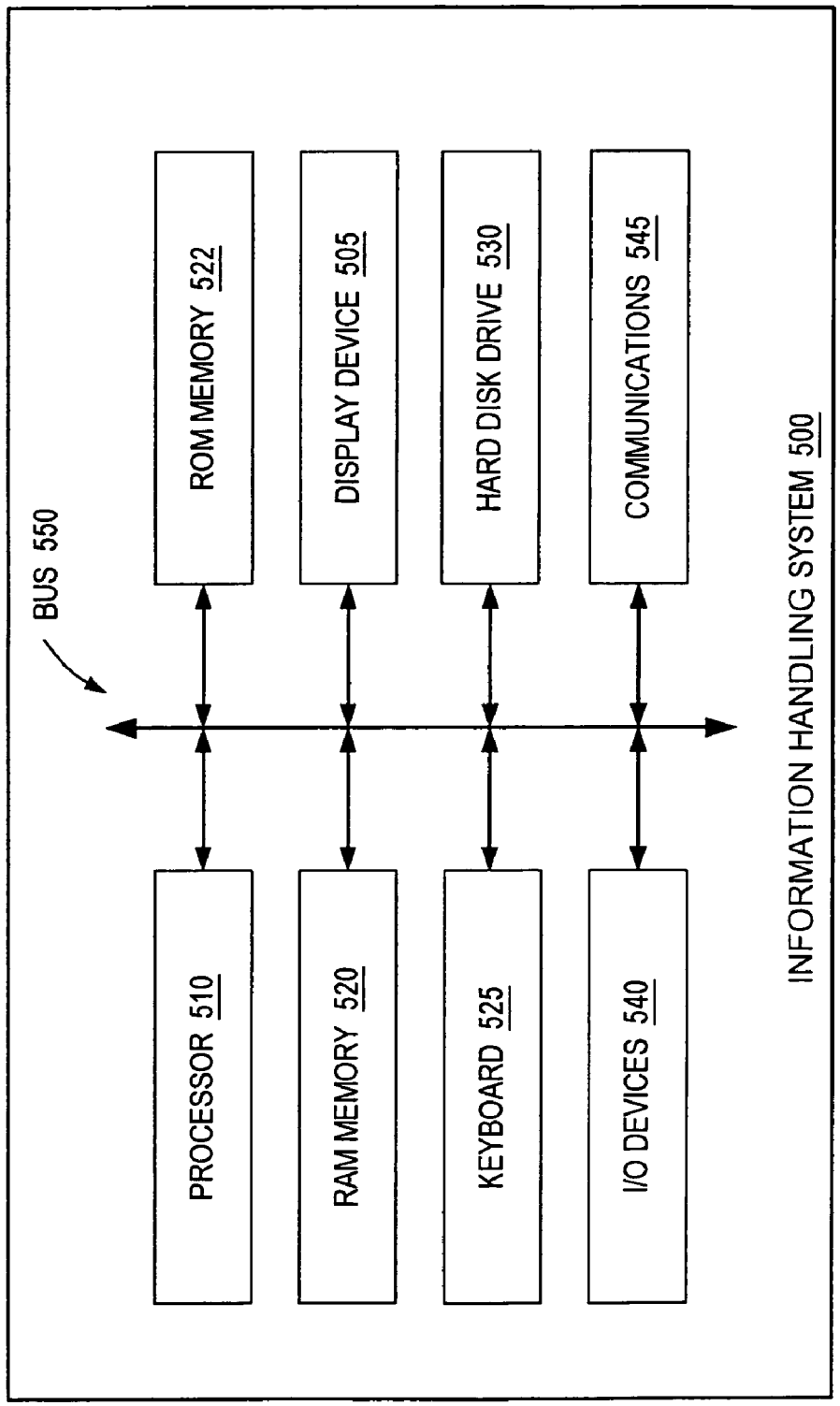
FIG. 5 illustrates a block diagram of an information handling system having an improved battery, according to an embodiment.

FIG. 5 illustrates a block diagram of an information handling system 500 having an improved battery (not shown), according to an embodiment. The information handling system 500 includes a processor 510, a system random access memory (RAM) 520 (also referred to as main memory), a non-volatile ROM 522 memory, a display device 505, a keyboard 525 and an I/O controller 540 for controlling various other input/output devices. In one embodiment, the I/O controller 540 is substantially the same as the keyboard controller, the embedded controller or the serial I/O controller. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. In one embodiment, the IHS 500 may include multiple instances of the bus 550. A communications controller 545, such as a network interface card, may be connected to the bus 550 to enable information exchange between the IHS 500 and other devices (not shown).

In one embodiment, the portable IHS 200 described in FIG. 2 is implemented as the IHS 500. In this embodiment, a power supply system (not shown) providing power to the IHS 500 incorporates the improved battery 210 (not shown) described in FIG. 2.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the battery 210 may be implemented as electronic hardware, it would be within the spirit and scope of the embodiments to encompass an embodiment using a controller/computer based software/firmware implementation. Accordingly, it is appropriate that the appended claims be construed broadly and in a manner consistent with the scope of the embodiments disclosed herein.

What is claimed is:

1. A battery coupled to an electrical device via a positive and negative battery terminals, the battery comprising:
    a cell stack operable to store a charge received through the battery terminals from the device;
    a sense resistor for measuring a current through the cell stack, wherein the sense resistor is electrically coupled to the stack;
    a ground switch coupled in series with a negative line of the cell stack and the negative battery terminal and operable to control the current; and
    a controller operable to control the ground switch in response to receiving an input indicative of the current, wherein the ground switch is operable to interrupt the current to the device in response to a transient failure event causing the current to be greater than a predefined value during a portion of a predefined time interval, and to enable the current to the device in response to a removal of the transient failure event causing the current to fail to be higher than the predefined value during another portion of the predefined time interval.

2. The battery of claim 1, further comprising:
    a charge switch operable to control the charge in response to receiving a charge enable control signal from the controller, wherein the charge switch is coupled in between the cell stack and the positive battery terminal.

3. The battery of claim 2, wherein the charge switch is disabled in response to the current being greater than the predefined value and enabled in response to the current failing to be greater than the predefined value during the another portion of the predefined time interval.

4. The battery of claim 2, wherein the controller is operable to open a fuse device coupled in series between the charge switch and the cell stack in response to the current being greater than the predefined value during the portion of the predefined time interval.

5. The battery of claim 1, wherein the transient failure event is caused by an electrical noise.

6. The battery of claim 5, wherein the noise is generated due to electromagnetic interference (EMI).

7. The battery of claim 5, wherein the noise is generated due to radio frequency interference (RFI).

8. The battery of claim 1, wherein the predefined time interval is less than a synchronous time interval frame defined for a system management bus (SMBus) communication.

9. The battery of claim 1, wherein the ground switch is coupled in series between the sense resistor and the negative battery terminal.

10. The battery of claim 1, wherein the ground switch is operable to control the current during a discharge mode of the cell stack.

11. A method for protecting a battery being charged by an electrical device, the method comprising:
measuring a current through the battery;
determining whether the current is above a predefined value;
isolating the device from the battery in response to a transient failure event causing the current to be above the predefined value during a portion of a predefined time interval, wherein the isolating is performed by a switch coupled in series with a negative line of a cell stack in the battery and a negative battery terminal;
determining whether the current remains above the predefined value during the predefined time interval; and
after the device has been isolated from the battery in response to the current being above the predefined value, recoupling the device to the battery in response to the current failing to be above the predefined value during another portion of the predefined time interval.

12. The method of claim 11, further comprising:
disabling the battery in response to the current being above the predefined value during the portion of the predefined time interval.

13. The method of claim 12, wherein the disabling of the battery includes blowing a fuse to interrupt the current.

14. The method of claim 11, wherein the isolating of the device from the battery includes opening a ground switch to interrupt the current.

15. The method of claim 14, wherein the recoupling includes closing the ground switch.

16. The method of claim 11, wherein the measuring of the current occurs at a selectable sampling frequency, wherein the sampling frequency varies approximately between 1 millisecond and 10 seconds.

17. An information handling system (IHS) comprising:
a processor; and
a power supply operable to provide power to the processor, wherein the power supply includes:
a charger operable to provide a charge; and
a battery operable to receive the charge from the charger via a pair of terminals, wherein the battery includes:
a cell stack operable to store the charge received from the charger through the terminals;
a sense resistor for measuring a current through the cell stack, wherein the sense resistor is electrically coupled to the stack;
a ground switch coupled in series with a negative line of the cell stack and a negative battery terminal and operable to control the current; and
a controller operable to control the ground switch in response to receiving an input indicative of the current, wherein the ground switch is operable to interrupt the current to the charger in response to a transient failure event causing the current to be greater than a predefined value during a portion of a predefined time interval, and after removal of the transient failure event within the predefined time interval causes the current to fail to be higher than the predefined value during another portion of the predefined time interval, to enable the current to the charger.

18. The system of claim 17, further comprising:
a charge switch operable to control the charge in response to receiving a charge enable control signal from the controller, wherein the charge switch is coupled in between the cell stack and a positive terminal of the pair of terminals.

19. The system of claim 18, wherein the controller is operable to open a fuse device coupled in series between the charge switch and the cell stack in response to the current being greater than the predefined value during the portion of the predefined time interval.

* * * * *